(12) United States Patent
Li et al.

(10) Patent No.: US 9,231,772 B2
(45) Date of Patent: Jan. 5, 2016

(54) METHOD AND APPARATUS FOR PROVIDING A USER WITH CHARGING-RELATED VOICE SERVICE

(75) Inventors: Xiangyang Li, Shanghai (CN); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 182 days.

(21) Appl. No.: 13/982,953

(22) PCT Filed: Jan. 4, 2012

(86) PCT No.: PCT/IB2012/000157
§ 371 (c)(1),
(2), (4) Date: Jul. 31, 2013

(87) PCT Pub. No.: WO2012/104712
PCT Pub. Date: Aug. 9, 2012

(65) Prior Publication Data
US 2013/0315230 A1    Nov. 28, 2013

(30) Foreign Application Priority Data

Feb. 1, 2011    (CN) .......................... 2011 1 0036090

(51) Int. Cl.
*H04L 12/66*    (2006.01)
*H04L 12/28*    (2006.01)
(Continued)

(52) U.S. Cl.
CPC ............ *H04L 12/14* (2013.01); *H04L 12/1403* (2013.01); *H04L 12/1425* (2013.01);
(Continued)

(58) Field of Classification Search
USPC .................... 370/259, 328, 352, 401; 705/30; 709/227
See application file for complete search history.

(56) References Cited

U.S. PATENT DOCUMENTS

| 6,404,870 B1 * | 6/2002 | Kia et al. .................. 379/144.01 |
| 6,700,961 B1 | 3/2004 | Dacloush et al. |

(Continued)

FOREIGN PATENT DOCUMENTS

| EP | 1 780 939 A1 | 5/2007 |
| JP | 2009-538569 | 11/2009 |
| WO | WO 2007/139877 | 12/2007 |

OTHER PUBLICATIONS

Japanese Office Action dated Sep. 18, 2014.
(Continued)

*Primary Examiner* — Andrew Lee
(74) *Attorney, Agent, or Firm* — Fay Sharpe LLP

(57) ABSTRACT

The present invention provides a ubiquitous solution for providing charge-related voice service such as voice announcement and interactive voice response in an IP multimedia subsystem. In particularly, an online charging system (10) detects the subscriber account profile of a user terminal (51) to determine whether there is an event for providing an end user with voice announcement or interactive voice response (S203). If there is such voice announcement event or interactive voice response event, the online charging system (10) will enter "redirection state" and send an instruction (S204) to an online charging client (20) for instructing the online charging client (20) to redirect the user terminal to a first server (30) for providing voice announcement or interactive voice response such that the first server (30) provides the user terminal (51) with voice announcement or interactive voice response. The online charging client (20) may comprise network gateway, session initiation protocol application server or media resource function controller, etc.

13 Claims, 6 Drawing Sheets

(51) Int. Cl.
  *H04L 12/14* (2006.01)
  *H04M 3/493* (2006.01)
  *H04M 7/00* (2006.01)
  *H04L 29/06* (2006.01)
  *H04M 15/00* (2006.01)
  *H04M 7/12* (2006.01)

(52) U.S. Cl.
  CPC .......... *H04L65/104* (2013.01); *H04L 65/1016* (2013.01); *H04M 3/493* (2013.01); *H04M 7/006* (2013.01); *H04M 15/61* (2013.01); *H04M 15/70* (2013.01); *H04M 15/705* (2013.01); *H04M 7/129* (2013.01)

(56) References Cited

U.S. PATENT DOCUMENTS

| | | | |
|---|---|---|---|
| 2005/0259806 A1* | 11/2005 | Chang | 379/218.01 |
| 2007/0133575 A1 | 6/2007 | Cai et al. | |
| 2007/0195825 A1* | 8/2007 | Wang | 370/493 |
| 2008/0056464 A1* | 3/2008 | Kalahasti et al. | 379/88.18 |
| 2008/0123603 A1 | 5/2008 | Cai et al. | |
| 2010/0120405 A1* | 5/2010 | Sapir et al. | 455/417 |
| 2011/0020955 A1* | 1/2011 | DeYoung | 438/4 |
| 2011/0060683 A1* | 3/2011 | Salmon Rock et al. | 705/41 |
| 2011/0158397 A1* | 6/2011 | Simoes et al. | 379/265.02 |

OTHER PUBLICATIONS

Yigang Cai et al., "IP Multimedia Subsystem Online Session Charging Call Control," Bell Labs Technical Journal, vol. 4, No. 10, XP001239291, pp. 117-132, Jan. 1, 2006.

"Digital cellular telecommunications system (Phase 2+); Universal Mobile Telecommunications System (UMTS); LTE; Telecommunication management; Charging management; IP Multimedia Subsystem (IMS) charging (3GPP TS 32.260 version 9.6.0 Release 9)," ETSI TS 132 260 V9.6.0, XP014062044, pp. 1-124, Jan. 1, 2011.

T. Melanchuk et al., "An Architectural Framework for Media Server Control," Internet Engineering Task Force, XP015065599, pp. 1-25, Jun. 1, 2009.

International Search Report for PCT/IB2012/000157 dated Sep. 25, 2012.

* cited by examiner

METHOD AND APPARATUS FOR PROVIDING A USER WITH CHARGING-RELATED VOICE SERVICE

FIELD OF THE INVENTION

The present invention relates to a communication network, more particularly, to a solution for providing charging-related voice announcement and interactive voice response (IVR) in an IP multimedia subsystem (IMS).

BACKGROUND OF THE INVENTION

As the network evolves to next generation network, an IP-based IMS network will provide calling services such as Voice over IP (VoIP). The capability of providing voice announcement and interactive voice response is a very important user experience for end users. For example, a user expects a charging system to provide voice announcement about subscriber account balance, awards and the like and when the balance is too low, to provide interactive voice response for performing recharging by inputting scratch-card number and PIN number, etc.

3GPP TS 32.260 standard defines that the online charging for IMS call is based on Diameter credit control protocol. In particular, an online charging client (also referred to as Diameter client) such as IMS gateway (IMSGW), application server (AS) or media resource function controller (MRFC) etc. request quota for resource usage from an online charging system (OCS) based on Ro interface; the OCS grants the quota, such as allowing the user to call for a period of time, to the user according to account profile such as the balance, and sends the quota to the online charging client via Ro interface; the online charging client controls the charging for calling according to the quota for resource usage received from the OCS.

However, because the interface to the OCS is Ro interface, the OCS cannot control IMS calls to provide voice announcement and interactive voice response to, for example, notify an end user of account profile or operate on the account profile, etc. Moreover, Diameter credit control protocol does not have the capability of providing announcement and interactive voice response, either. Thus, the existing system cannot provide charging-related voice announcement and interactive voice response.

Without voice announcement or interactive voice response, user's experience for IMS call charging is greatly impacted. This will be an obstacle for operators to deploy prepaid voice services over IMS network, such as IMS fixed line calling card solution.

SUMMARY OF THE INVENTION

Accordingly, an aim of the present invention is to a ubiquitous solution for providing charge-related voice service such as voice announcement or interactive voice response in an IP multimedia subsystem.

In particularly, an online charging system detects the subscriber account profile of a user terminal to determine whether there is an event for providing an end user with voice announcement or interactive voice response. If there is such voice announcement event or interactive voice response event, the online charging system will enter "redirection state" and send an instruction to an online charging client for instructing the online charging client to redirect the user terminal to a first sever for providing voice announcement or interactive voice response such that the first server provides the user terminal with voice announcement or interactive voice response.

The online charging client may comprise an IP multimedia subsystem network gateway, session initiation protocol application server or media resource function controller. The first server may comprise a media resource function device or an interactive voice response device, etc.

In case of voice announcement event, the online charging system can include the address of the media resource function device in the instruction sent to the online charging client; next, the online charging client performs redirection operation according to this address so as to redirect the call of the user terminal in the online charging client to the media resource function device; next, the media resource function device provides the user terminal with charging-related voice announcement.

In case of interactive voice response event, the online charging system can include the address of the interactive voice response device in the instruction sent to the online charging client; next, the online charging client performs redirection operation according to this address so as to redirect the call of the user terminal in the online charging client to the interactive voice response device; next, the interactive voice response device provides the user terminal with charging-related interactive voice response. The interactive voice response device comprises an interactive voice response application server, for example.

Preferably, after said first server completes said voice announcement and/or interactive voice response, the online charging client instructs the online charging system to end the "redirection state" and to redirect said user terminal to the counterpart user terminal so as to resume the normal calling procedure.

According to an aspect of the present invention, there is provided with a method of providing a user with charging-related voice service in an online charging system of an IP multimedia subsystem. It comprises the following steps: determining whether there exists an event of providing said user with said voice service according to account profile of said user; if said event exists, sending, to an online charging client, a first instruction for instructing said online charging client to redirect said user to a first server for providing said voice service, wherein said first instruction includes an identifier of said first server and a first information related to content of said voice service.

According to another aspect of the present invention, there is provided with a method of providing a user with charging-related voice service in an online charging client of an IP multimedia subsystem. It comprises the following steps: receiving, from an online charging system, a first instruction for instructing said online charging client to redirect said user to a first server for providing said voice service, wherein said first instruction includes an identifier of said first server and a first information related to content of said voice service; according to said first instruction, sending a first message including said first information to said first server so as to redirect said user to said first server.

According to another aspect of the present invention, there is provided with a method of providing a user with charging-related voice service in a media resource function device of an IP multimedia subsystem. It comprises the following steps: receiving, from an online charging client or an interactive voice response device, a second information for instructing said media resource function device to perform voice announcement related to said voice service; generating corresponding announcement information according to said second information, and play said announcement information to said user.

According to another aspect of the present invention, there is provided with a method of providing a user with charging-related voice service in an interactive voice response device of an IP multimedia subsystem. It comprises the following steps: receiving, from an online charging client, a third information for instructing said interactive voice response device to perform interactive voice response related to said voice service; performing a corresponding interactive operation according to said third information.

BRIEF DESCRIPTION OF DRAWINGS

With reference to the following detailed description of the non-restrictive embodiments in combination with the accompany drawings, other features, advantages of the present invention will be more apparent.

wherein, same or similar reference numerals refer to same or similar step features or apparatus (module) features.

DETAILED DESCRIPTION OF EMBODIMENTS

For the illustrative purpose, IP Multimedia Subsystem (IMS) in the 3GPP architecture is taken as an example to describe the present invention in below. Those skilled in the art should understand based on the description in below that the solution for providing charging-related voice service proposed by the present invention is also applicable for any other communication network architecture based on packet switch.

Figure 1:
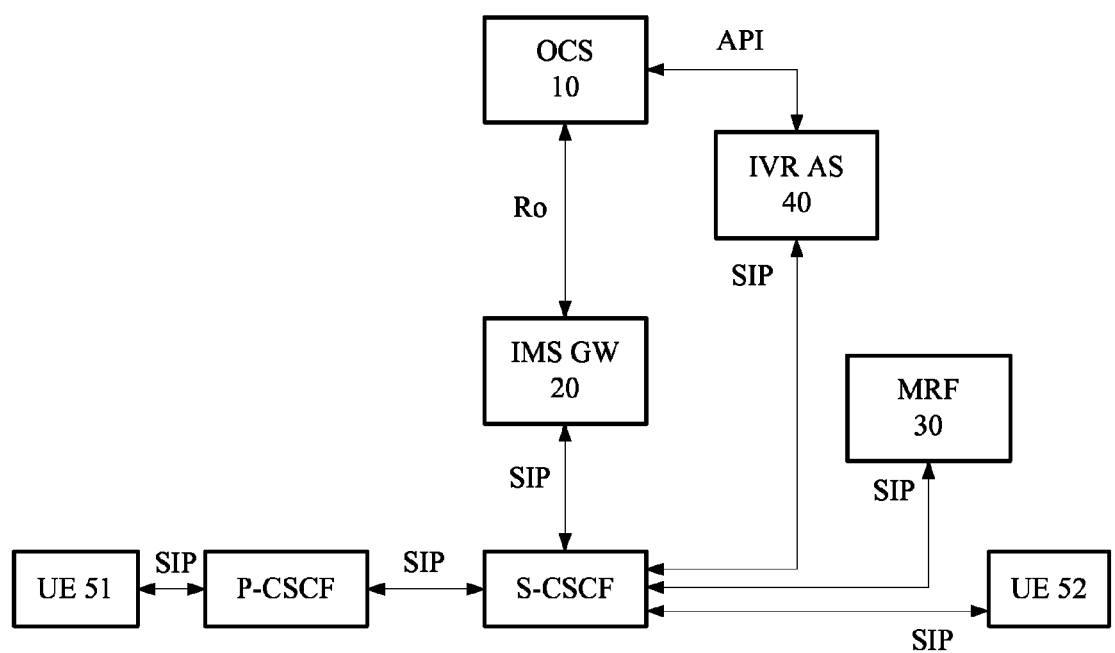
FIG. 1 illustrates a block diagram of a system for providing a user with charging-related voice service according to an embodiment of the present invention.

FIG. 1 illustrates a block diagram of a system for providing a user with charging-related voice service according to an embodiment of the present invention.

In the IP Multimedia Subsystem, user equipment (UE) 51 and user equipment 52 can perform calling service based on Session Initiation Protocol (SIP). Call Session Control Function (CSCF) is a function entity inside the whole IMS and can be categorized into Proxy CSCF (P-CSCF), Interrogating CSCF (I-CSCF) and Serving CSCF (S-CSCF) according to the function. Essentially, they are all SIP servers and process SIP signaling. Online Charging System (OCS) 10 uses Credit Control Protocol based on Diameter to perform online charging for user session such as calling session, for example to grant the quota of network resource usage according to account balance and deduct the corresponding charge from subscriber account. As online charging client, IMS Gateway (IMS GW) 20 requests online charging system 10 to grant a quota of resource usage via Ro interface on the one hand, and controls user session according to the corresponding granted quota via SIP interface on the other hand. These are described in detail in the 3GPP specifications, and are therefore briefly introduced herein.

Online charging system 10 has subscriber account profile for each user, for example including balance, charging rate, bonus, etc. Online charging system 10 determines whether there exists an event for providing the user with charging-related voice service according to subscriber account profile. Such event can be divided into two types: event for providing a user with voice announcement and event for providing a user with interactive voice response (IVR), which are also referred to as announcement event and IVR event. Announcement event mainly relates to notifying a user of charging-related information, for example including account balance, bonus, discount, alert, etc.; and IVR event mainly relates to events requiring user interactions, e.g. user performing operations such as inquiring, modification or recharging to subscriber profile by inputting related information.

Online charging system 10 can trigger announcement event or IVR event according to pre-stored rules, such as:
asking a user to perform IVR recharging when its account balance is too low;
playing announcement to alert a user when its spending limit threshold is reached; or
playing announcement to notify a user of bonus information when a usage bonus is awarded to the user.

According to the type of the triggered event, online charging system 10 instructs IMS gateway 20 to redirect the user to a first server to provide the corresponding voice service. The first server comprises media resource function device (MRF) or interactive voice response application server (IVR application server, IVR AS). In particular, if an announcement event is triggered, the user is redirected to media resource function device 30 and media resource function device 30 plays the corresponding announcement to the user; if an IVR event is triggered the user is redirected to IVR application server 40 and IVR application server 40 provides the user with interactive voice service, which includes, for example, performing "Prompt and Collection" operation, namely playing prompts and collecting user input, by making use media resource function device 30, and performing operations on subscribe profile in online charging system 10 via application program interface (API).

Online charging system can provide a user with charging-related voice service at any time as needed. For example, before a call, namely before connecting user terminal 51 to counterpart user terminal 52, announcement about the rate of this call can be played to user terminal 51; during the call, the user can be asked to perform IVR recharging when this call is to be interrupted due to insufficient balance; after the call, e.g. after the hang-up of user terminal 52, user terminal 51 can be notified of the charge for this call or can be provided with an opportunity to operate on its subscriber account profile.

Furthermore, online charging system 10 can determine whether to provide voice service in response to a charging-related request from IMS gateway 20. Additionally or alternatively, online charging system 10 can determines whether to provide voice service by itself. For example, during a call, the subscriber profile changes, and so online charging system 10 determines to notify the user of such change.

The method of providing voice announcement and the method of providing interactive voice response are respectively described in details by taking the case before a call as an example in the following.

Figure 2:
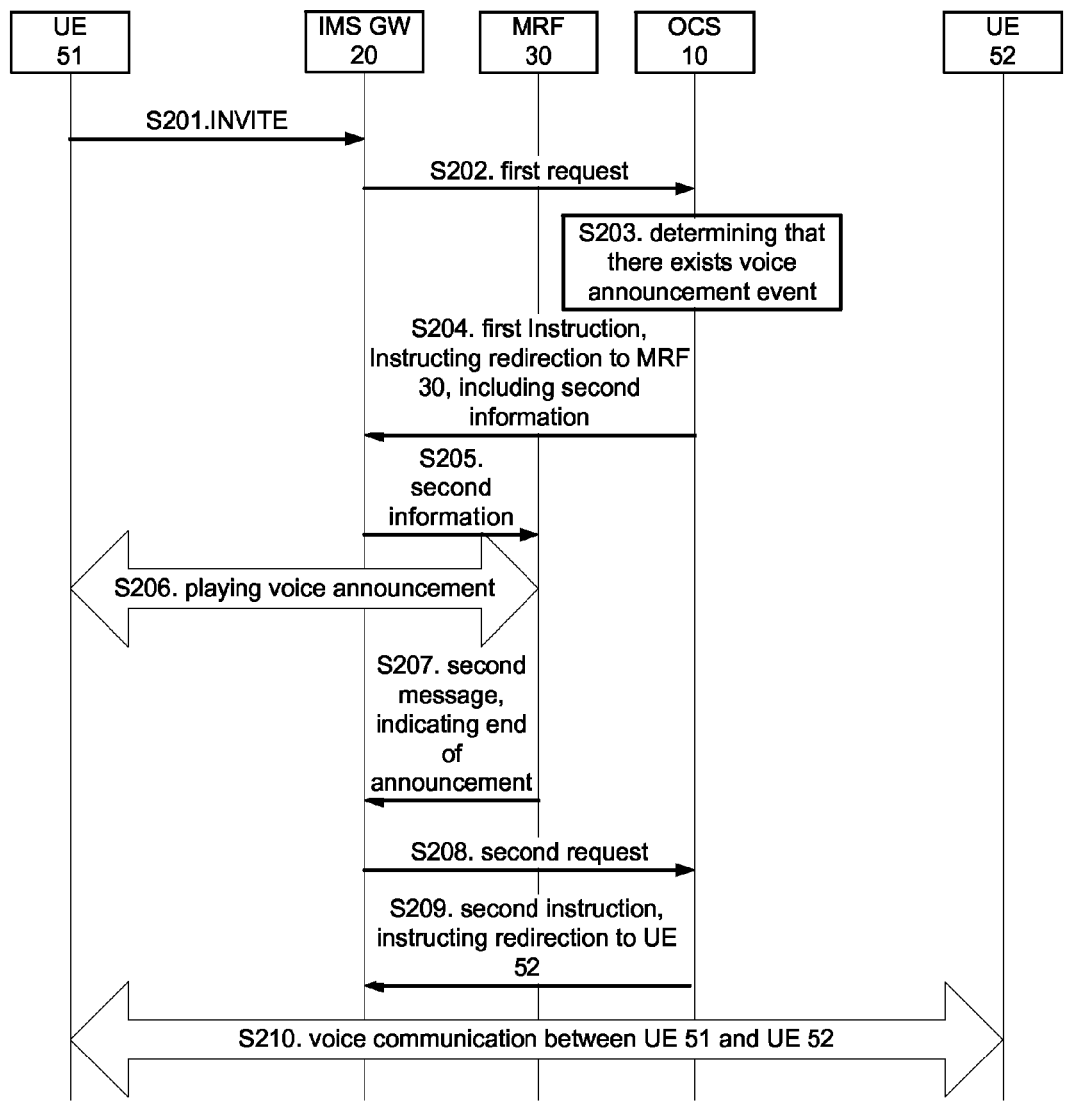
FIG. 2 illustrates a flow chart of a method of providing a user with charging-related voice announcement according to an embodiment of the present invention.
Figure 3:
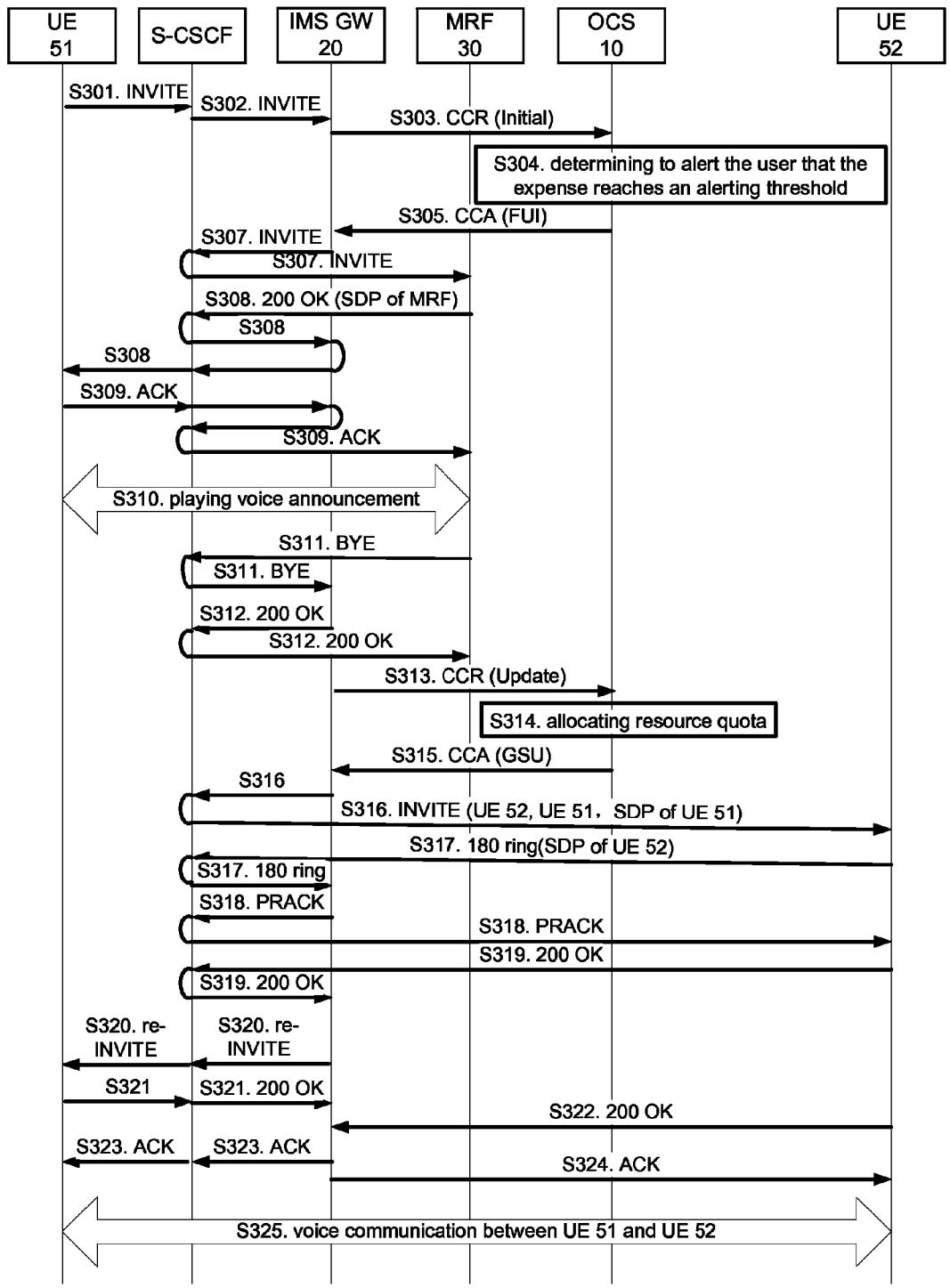
FIG. 3 illustrates a flow chart of an example of the method in FIG. 2.

FIG. 2 illustrates a flow chart of a method of providing a user with charging-related voice announcement according to an embodiment of the present invention. FIG. 3 illustrates a flow chart of an example of the method in FIG. 2.

Referring to FIG. 2, firstly, in step S201, an inviting message INVITE sent by calling user equipment 51 to called user equipment 52 is routed to IMS gateway 20. For example, such inviting message is routed to S-CSCF via P-CSCF, I-CSCF, and then sent to IMS gateway 20, as shown in steps S301 to S302 in FIG. 3. Optionally, S-CSCF may perform the corresponding interaction with other SIP application servers based on initial filter criteria (iFC) before routing this inviting message to IMS gateway 20.

After receiving this inviting message, IMS gateway 20 sends a first request to online charging system 10 in step S202. This first request is related to the online charge for the call invited by user equipment 51. In the example of FIG. 3, this step is implemented by step S303. In step S303, IMS gateway 20 sends credit control request (CCR) message, namely initial charging request CCR (Initial) for detecting whether the balance of the calling party is enough to fund this call.

After receiving the first request, online charging system 10 determines, in step S203, whether there exists an event for providing user 51 with voice service according to the account profile of calling user 51. In this example, there exists an event for voice announcement. Then, in step S204, online charging system 10 enters "redirection" state, and sends a first instruction for instructing redirection to IMS gateway 20. This first instruction comprises the identifier of media resource function device 30 for providing voice announcement, the identifier of calling user 51 and a second information related to the content of the voice announcement. Steps S203 and S204 correspond to S304 and S305 in FIG. 3, respectively. In step S304, online charging system 10 detects that the expense of calling user 51 has reached an alerting threshold and thus determines to provide user 51 with the corresponding alert. Then, in step S305, online charging system 10 sends, to IMS gateway 20, a credit control answer (CCA) message CCA (FUI), which includes "Final-Unit-Indication (FUI)" attribution value pair (AVP). In this "Final-Unit-Indication" attribution value pair, "Final-Unit-Action" is set to REDIRECT, and "Redirect-Server-Address" is set as SIP universal resource identifier (SIP URI). SIP URI includes the address of media resource function device 30 and second information related to the content of the announcement. This second information can comprise the announcement information itself or the identifier of the announcement information, and can further comprise variable part. For example, this variable part can indicate the number of the account balance.

After receiving the first instruction, in step S205, IMS gateway 20 connects user equipment 51 to the first server namely media resource function device 30 according to the identifier of the first server and the identifier of the user in the first instruction, and forwards the second information in the first instruction to media resource function device 30. This step corresponds to steps S307 to S309 of FIG. 3. In particular, in step S307, IMS gateway 20 sends SIP inviting message INVITE to media resource function device 30 via S-CSCF. This inviting message includes the second information included in credit control answer message CCA (FUI). In step S308, after receiving this SIP inviting message, media resource function device 30 detects whether resources are available for the announcement, and if yes, sends message 200 OK which includes session description protocol (SDP) information of media resource function device 30 to IMS gateway 20 via S-CSCF so as to establish a session based on real-time transport protocol (RTP) for voice announcement; and IMS gateway 20 sends in turn message 200 OK to user equipment 51 via IMS gateway 20. In step S309, if accepting the SDP information in message 200 OK, user equipment 51 sends SIP acknowledgement message ACK to IMS gateway 20 and media resource function device 30 via S-CSCF. At this point, a RTP session for bearing voice announcement is established between media resource function device 30 and user equipment 51.

After receiving the second information related to the content of the announcement, in step S206, media resource function device 30 determines announcement information according to the second information and plays this announcement information to user equipment 51. Preferably, media resource function device 30 comprises a database. In the case that the second information includes the identifier of the announcement information, media resource function device 30 acquires the corresponding announcement information, such as the corresponding voice file, from the database according to this identifier. In the case that the second information includes a variable part, media resource function device 30 constructs announcement information including this variable part. Referring to FIG. 3, in step S310, the corresponding voice announcement is played through the established RTP session.

After the voice announcement ends, in step S207, media resource function device 30 sends a second message for indicating the end of the voice announcement to IMS gateway 20. This step corresponds to steps S311 to S312 in FIG. 3. In step S311, after the voice announcement is successfully played, media resource function device 30 sends SIP goodbye message BYE to IMS gateway 20 via S-CSCF so as to release the RTP session between it and user equipment 51. In step S312, in response to the received SIP goodbye message BYE, IMS gateway 20 sends SIP message 200 OK to media resource function device 30 via S-CSCF. At this point, the RTP session between media resource function device 30 and user equipment 51 is released.

In step S208, IMS gateway 20 sends a second requires for indicating the end of voice service to online charging system 10. As shown by step S313 of FIG. 3, based on the received message 200 OK, IMS gateway 20 knows that the session redirected to media resource function device 30 has ended, and then sends an update charging request CCR (Update) to request a quota for resource usage based on the current charging rate.

After receiving the second request for indicating the end of the voice service, in step S209, online charging system 10 sends, to IMS gateway 20, a second instruction, which instructs IMS gateway 20 to redirect calling user equipment 51 to called user equipment 52. This corresponds to steps S314 to S315 in FIG. 3. In step S314, in response to the received update charging request CCR (Update), online charging system 10 exits "redirection" state, and allocates resource quota to user equipment 52 based on the current charging rate; next, in step S315, online charging system 10 sends credit control answer (CCA) message CCA (GSU) to IMS gateway 20. This credit control answer includes "Granted-Service-Unit (GSU)" attribute value pair, which including the allocated resource quota.

After receiving the second instruction, in step S210, IMS gateway 20 redirects calling user 51 to called user 52 such that calling user equipment 51 can perform voice communication with called user equipment 52. In particular, this step S210 can be implemented by steps S316 to S325 in FIG. 3.

Firstly, in step S316, after receiving the resource quota allocated by online charging system 10, IMS gateway 20 sends, to the counterpart user equipment 52, inviting message INVITE (called party, calling party, SDP information of calling party), which includes the identifier of the called party, the identifier of the calling party and the SDP information of the calling party. Next, in step S317, after receiving the inviting message, the called user equipment 52 sends, to IMS gateway 20, response message 180 Ring, which includes the SDP information of user equipment 52. After receiving this response message, IMS gateway 20 sends, in step S318, acknowledgement message PRACK to the called user equipment 52 via S-CSCF. Then, in step S319, user equipment 5 sends a response 200 OK for this acknowledgement message PRACK to IMS gateway 20 via S-CSCF. Once receiving the response message sent by user equipment 52 in step S317, IMS gateway 20 sends, in step S320, inviting reply message re-INVITE to the calling user equipment 51 via S-CSCF. This message includes the SDP information of user equipment 52. In step S321, when user equipment 51 receives the inviting reply message and recognizes that this inviting reply message is a reply to the inviting that has been sent, user equipment 51 sends the corresponding acknowledgement message 200 OK to IMS gateway 20. Once the called user answers the call, the called user equipment 52 sends, in step S322, a reply 200 OK to the inviting message in step S316 to IMS gateway 20 via S-CSCF. Then, in steps S323 and S324, IMS gateway 20 respectively sends acknowledgement message ACK to user equipments 51 and 52 via S-CSCF. At this point, a voice session is established between user equipments 51 and 52. In step S325, the calling party 51 and the called party 52 can perform voice communication.

Figure 4:
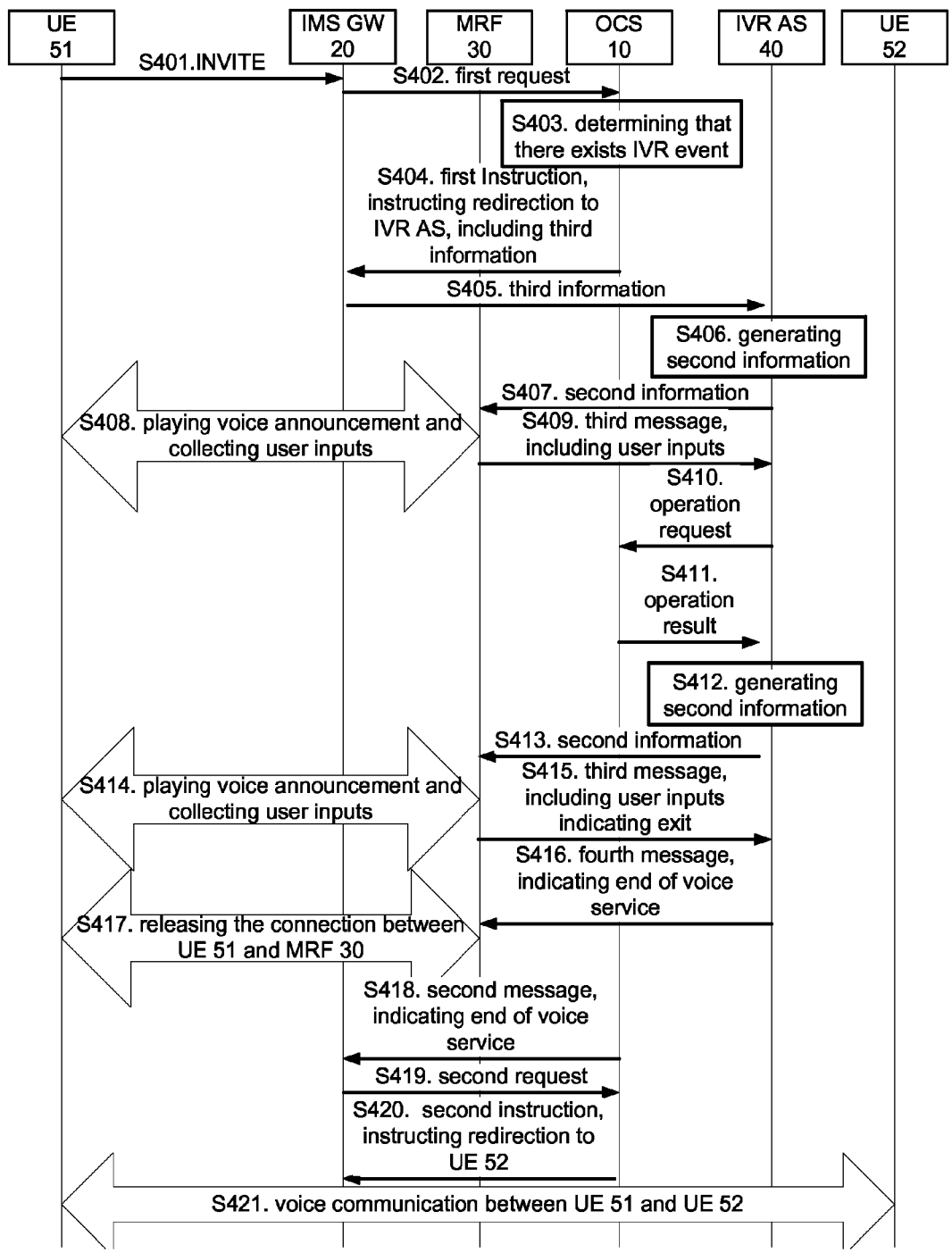
FIG. 4 illustrates a flow chart of a method of providing a user with charging-related interactive voice response according to an embodiment of the present invention.
Figure 5:
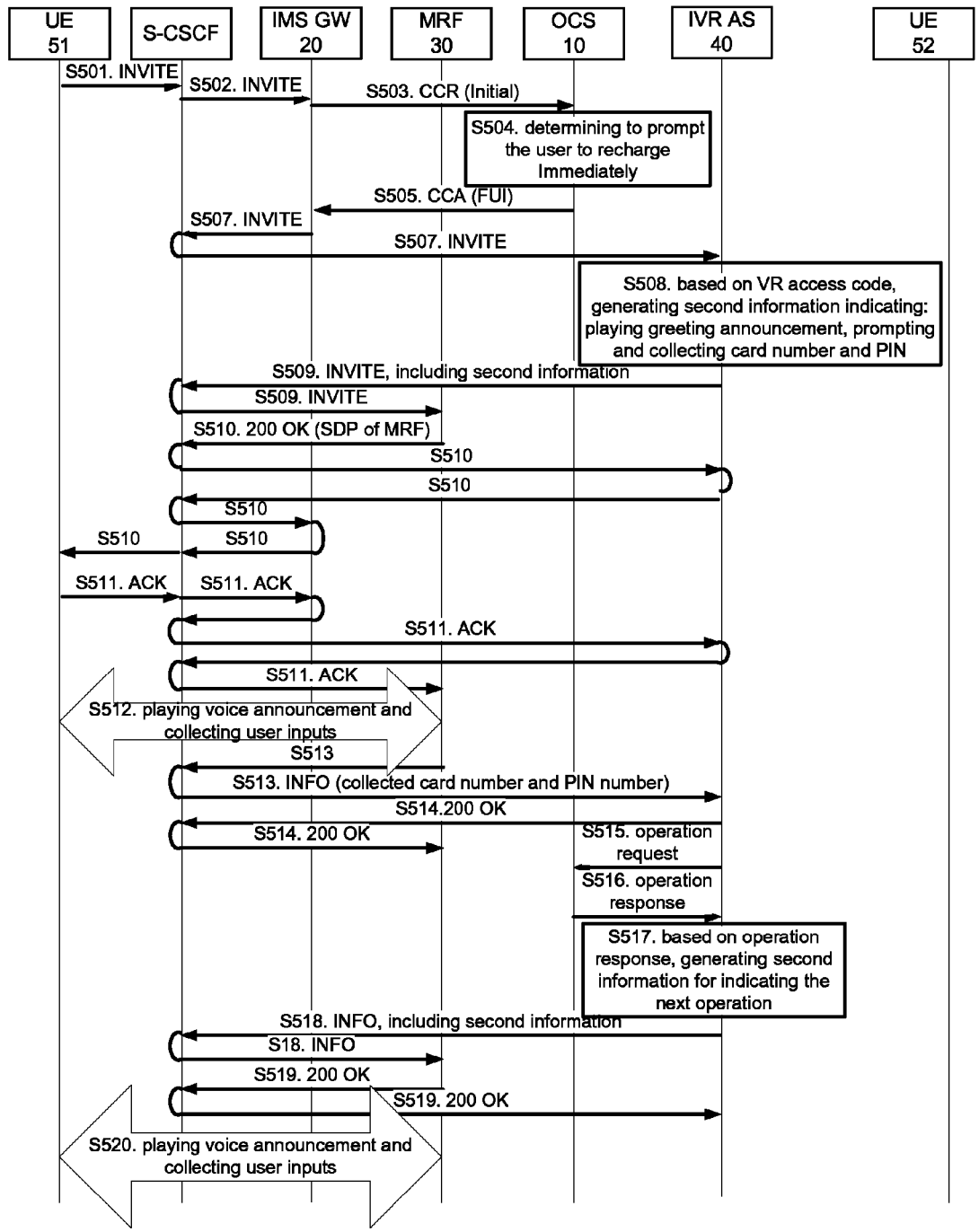
FIG. 5 illustrates a flow chart of an example of the method in FIG. 4.
Figure 5:
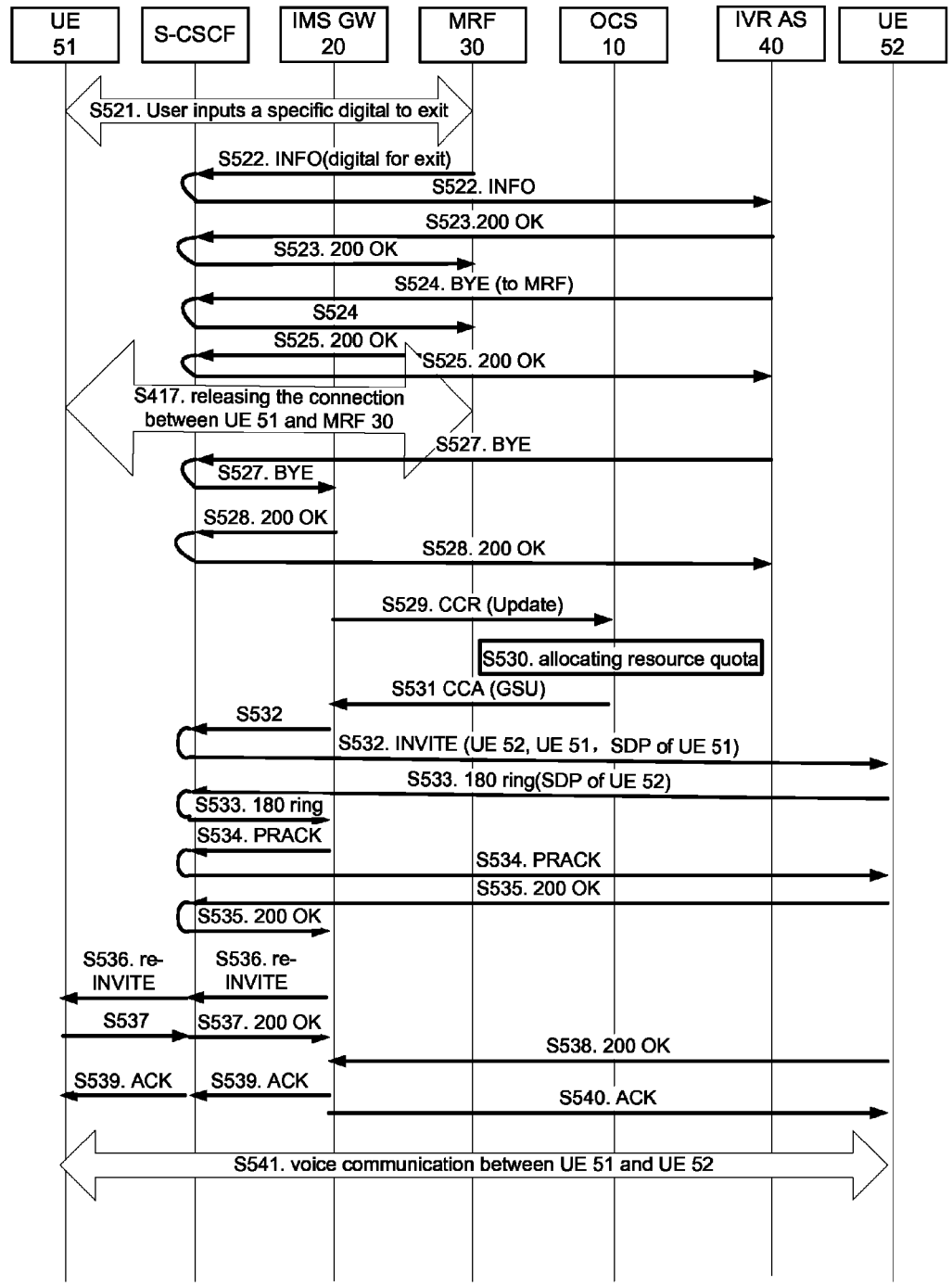

FIG. 4 illustrates a flow chart of a method of providing a user with charging-related interactive voice response according to an embodiment of the present invention. FIG. 5 illustrates a flow chart of an example of the method in FIG. 4.

Referring to FIG. 4, firstly, in step S401, an inviting message INVITE sent by calling user equipment 51 to the called user equipment 52 is routed to IMS gateway 20. For example, this inviting message can be routed to S-CSCF via P-CSCF and I-CSCF and then sent to IMS gateway 20, as shown in steps S501 to S502 in FIG. 5. Optionally, S-CSCF may perform the corresponding interaction with other SIP application servers based on initial filter criteria (iFC) before routing this inviting message to IMS gateway 20.

After receiving this inviting message, IMS gateway 20 sends a first request to online charging system 10 in step S402. This first request is related to the online charge for the call invited by user equipment 51. In the example of FIG. 5, this step is implemented by step S503. In step S503, IMS gateway 20 sends credit control request (CCR) message, namely initial charging request CCR (Initial) for detecting whether the balance of the calling party is enough to fund this call.

After receiving the first request, online charging system 10 determines, in step S403, whether there exists an event for providing user 51 with voice service according to the account profile of calling user 51. In this example, there exists an event for interactive voice response. Then, in step S404, online charging system 10 enters "redirection" state, and sends a first instruction for instructing redirection to IMS gateway 20. This first instruction comprises the identifier of interactive voice response application server (IVR AS) 40 for providing interactive voice response, the identifier of calling user 51 and a third information related to the content of the interactive voice response. Steps S403 and S404 correspond to S504 and S505 in FIG. 5, respectively. In step S504, online charging system 10 detects that the balance of calling user 51 is too low and thus determines to prompt user 51 to recharge the account immediately through interactive voice response. Then, in step S505, online charging system 10 sends, to IMS gateway 20, a credit control answer (CCA) message CCA (FUI), which includes "Final-Unit-Indication (FUI)" attribution value pair (AVP). In this "Final-Unit-Indication" attribution value pair, "Final-Unit-Action" is set to REDIRECT, and "Redirect-Server-Address" is set to SIP universal resource identifier (SIP URI). SIP URI includes the address of interactive voice response application server 40 and the third information related to the content of the determined interactive voice response. This third information can comprise the access code indicating the determined interactive voice response.

After receiving the first instruction, in step S405, IMS gateway 20 connects user equipment 51 to the first server, namely interactive voice response application server 40, according to the identifier of the first server and the identifier of the user in the first instruction, and forwards the third information in the first instruction to interactive voice response application server 40. This step corresponds to step 507 in FIG. 5. In step S507, IMS gateway 20 sends SIP inviting message to interactive voice response application server 40 via S-CSCF, wherein this inviting message includes the access code in credit control answer message CCA (FUI).

After receiving access code, in step S406, interactive voice response application server 40 determines the corresponding interactive voice response according to this access code, and generates second information for instructing media resource function device 30 to perform the corresponding voice announcement and "Prompt and Collection" operation. The "Prompt and Collection" operation refers to prompting a user to input and collecting inputs from the user. Preferably, interactive voice response application server 40 comprises a database and can acquire the corresponding interactive voice response from the database according to the access code. In the example of FIG. 5, in step S508, interactive voice response application server 40 recognizes, by inquiring its internal database, that the interactive voice response corresponding to the access code is to notify the user that the balance is too low and to prompt the user to input scratched card number and PIN number to recharge. Thus, the second information generated by interactive voice response application server 40 instructs, for example, media resource function device 30 to perform the following operations: firstly, greeting announcement is played to notify the user that the balance is too low; then, "Prompt and Collection" operation is performed to notify the user of inputting scratched card number and PIN number and to collect the user inputs.

In step S407, interactive voice response application server 40 sends the generated second information to media resource function device 30. As shown in FIG. 5, in step S509, interactive voice response application server 40 sends inviting message INVITE which includes the generated second information to media resource function device 30.

After receiving the second information, in step S408, media resource function device 30 determines announcement information according to the second information, and plays the announcement information to user 51 as well as collects the user inputs. This step corresponds to steps S510 to S512 in FIG. 5. In particular, in step 510, media resource function device 30 detects whether resources are available for the announcement, and if yes, sends message 200 OK including session description protocol (SDP) information of media resource function device 30 to IMS gateway 20 via S-CSCF so as to deliver the capability of RTP (Real-time Transport Protocol) session of media resource function device 30; next, IMS gateway 20 sends his message 200 OK to user equipment 51 via S-CSCF. In step S511, if accepting the SDP information in message 200 OK, user equipment 51 sends SIP acknowledgement message ACK to IMS gateway 20 and interactive voice response application server 40 via S-CSCF; finally, this acknowledgment message ACK is forwarded to media resource function device 30. At this point, a RTP session capable of bearing voice announcement is established between media resource function device 30 and user equipment 51. Next, in step S512, media resource function device 30 plays the corresponding voice announcement to user equipment 51, including notifying the user of a too low balance as well as prompting the user to input scratched card number and PIN number and collecting the user inputs.

After receiving the inputs from the user, in step S409, media resource function device 30 generates a third message indicating the user inputs and sends this third message to interactive voice response application server 40. Preferably, this third message uses media server control markup language (MSCML). As shown in FIG. 5, in step S513, media resource function device 30 generates MSCML response which includes information representing the card number and the PIN number input by the user, and sends SIP message INFO including this MSCML response to interactive voice response application server 40 via S-CSCF. In step S514, interactive voice response application server 40 sends reply message 200 OK for this SIP message to media resource function device 30 via S-CSCF.

After receiving the third message indicating the user inputs, in step S410, interactive voice response application server 40 performs predetermined operation according the third message. In this case, the third message is used to instruct operation on the account profile of the user, and thus, interactive voice response application server 40 generates the corresponding operation request and sends this operation request to online charging system 10. In the example of FIG. 5, in step S515, interactive voice response application server 40 obtains the card number and the PIN number from the third message, and sends the obtained card number and PIN number to online charging system 10. Preferably, interactive voice response application server 40 can verify the card number and PIN number before sending. For example, when the length of the card number input by the user does not conform with the predetermined length, interactive voice response application server 40 may prompt the user to re-input.

After receiving the operation request, in step S411, online charging system 10 performs the corresponding operation on the account profile of user equipment 51 according to the received operation request, and sends the operation results to interactive voice response application server 40. As shown in FIG. 5, in step S516, online charging system 10 performs recharging for user equipment 51 according to the card number and PIN number included in the operation request, and sends an operation response back to interactive voice response application server 40, wherein the operation response includes a result of successful recharging.

After receiving the operation result from online charging system, in step S412, interactive voice response application server 40 notifies user equipment of this operation result and generates another "Prompt and Collection" operation to instruct user 51 to perform the next operation. Next, in step S413, interactive voice response application server 40 sends second information for instructing the next operation to media resource function device 30; in step S414, media resource function device 30 performs the corresponding "Prompt and Collection" operation; in step S415, media resource function device 30 sends the collected user inputs to interactive voice response application server 40. In the example of FIG. 5, the above steps S412 to S415 correspond to steps S517 to S523, which are described in the following.

In step S517, based on the result of successful recharging received from online charging system 10, interactive voice response application server 40 generates the corresponding second information for instructing media resource function device 30 to notify the user of recharging result and prompt the user to select the next operation according to the menu. For example, the operations indicated in the menu comprises connecting to the called party, ending the current call, modifying PIN, transfer balance, etc. In step S518, interactive voice response application server 40 sends message INFO (prompting to select the next operation) including the generated second information to media resource function device 30 via S-CSCF. In step S519, media resource function device 30 sends the corresponding reply message 200 OK to interactive voice response application server 40 via S-CSCF. In step S520, media resource function device 30 plays the voice announcement corresponding to the second information to user 51. In step S521, media resource function device 30 collects the inputs from the user, namely the selection for the next operation. In this case, the user selects a specified digital for exiting the IVR operation. In step S522, media resource function device 30 generates third message INFO (a digital for exiting) indicating the user inputs, and sends the third message to interactive voice response application server 40.

After receiving the third message for requesting exit, in step S416, interactive voice response application server 40 sends a fourth message for indicating the end of voice service to media resource function device 30. After receiving the fourth message, in step S417, media resource function device 30 ends the voice service. In step S418, interactive voice response application server 40 sends second message for indicating the end of voice service to IMS gateway 20. In the example of FIG. 5, steps S416 to S418 are implemented by steps S524 to S528. In step S524, interactive voice response application server 40 sends bye message BYE to media resource function device 30 via S-CSCF so as to release the RTP connection between media resource function device 30 and user equipment 51. Media resource function device 30 sends reply message 200 OK to interactive voice response application server 40 via S-CSCF in step S525, and releases the RTP connection between media resource function device 30 and user equipment 51 in step S526. In step S527, interactive voice response application server 40 further sends bye message BYE to IMS gateway 20 via S-CSCF. After receiving the bye message, in step S528, IMS gateway 20 sends SIP message 200 OK back to interactive voice response application server 40 via S-CSCF.

The subsequent steps S419 to S421 is similar to the steps S208 to S210 in FIG. 2, and are therefore not repeated anymore. Likewise, the steps S529 to S541 in FIG. 5 are also similar to the steps S313 to S325 in FIG. 3, and are therefore not repeated anymore.

The present invention has been described from the view of method step in the above, and the present invention will be further described from the view of apparatus in the below.

According to an aspect of the prevent invention, there is provided with an apparatus for providing a user with charging-related voice service in an online charging system of an IP multimedia subsystem. It comprises: a first determining unit for determining whether there exists an event of providing said user with said voice service according to account profile of said user; a first sending unit, if said event exists, said first sending unit sending, to an online charging client, a first instruction for instructing said online charging client to redirect said user to a first server for providing said voice service, wherein said first instruction includes an identifier of said first server and a first information related to content of said voice service.

According to another aspect of the prevent invention, there is provided with an apparatus for providing a user with charging-related voice service in an online charging client of an IP multimedia subsystem. It comprises: a receiving unit for receiving, from an online charging system, a first instruction for instructing said online charging client to redirect said user to a first server for providing said voice service, wherein said first instruction includes an identifier of said first server and a first information related to content of said voice service; a second sending unit for sending a first message including said first information to said first server according to said first instruction so as to redirect said user to said first server.

According to another aspect of the prevent invention, there is provided with an apparatus for providing a user with charging-related voice service in a media resource function device of an IP multimedia subsystem. It comprises: a second receiving unit for receiving, from an online charging client or an interactive voice response device, a second information for instructing said media resource function device to perform voice announcement related to said voice service; a first processing unit for generating corresponding announcement information according to said second information, and play said announcement information to said user.

According to another aspect of the prevent invention, there is provided with an apparatus for providing a user with charging-related voice service in an interactive voice response device of an IP multimedia subsystem. It comprises: a third receiving unit for receiving, from an online charging client, a third information for instructing said interactive voice response device to perform interactive voice response related to said voice service; a second processing unit for performing a corresponding interactive operation according to said third information.

The embodiments of the present invention have been described in the above. It should be noted that, the present invention is not limited to the above specific embodiments, and any variation or modification can be made by those skilled in the art without departing from the scope of the appended claims.

The invention claimed is:

1. A method of providing a user with charging-related voice service in an online charging system of an IP multimedia subsystem, comprising:
   determining whether there exists an event of providing said user with said voice service according to account profile of said user;
   if said event exists, sending, to an online charging client, a first instruction for instructing said online charging client to redirect said user to a first server for providing said voice service, wherein said first instruction includes an identifier of said first server and a first information related to content of said voice service;
   wherein
   if said event is an event of providing said user with voice announcement, said first server is a media resource function device, and said first information includes a second information for instructing said media resource function device to perform voice announcement related to said event of voice announcement; and
   if said event is an event of providing said user with interactive voice response, said first server is an interactive voice response device, and said first information includes a third information for instructing said interactive voice response device to perform interactive voice response related to said event of interactive voice response.

2. A method according to claim 1, further comprising, after the sending, if said first server is an interactive voice response device:
   receiving, from said first server, an operation request for operating said account profile;
   operating said account profile according to said operation request.

3. A method according to claim 1, further comprising, before the determining:
   receiving, from said online charging client, a first request related to online charging for a session between said user and a counterpart user; and
   said determining further comprises: determining whether there exists said event of providing said user with said voice service according to said first request.

4. A method according to claim 3, further comprising, after the sending:
   receiving, from said online charging client, a second request for indicating end of said voice service;
   sending, to said online charging client, a second instruction for instructing said online charging client to redirect said user to said counterpart user.

5. A method of providing a user with charging-related voice service in an online charging client of an IP multimedia subsystem, comprising:
   receiving, from an online charging system, a first instruction for instructing said online charging client to redirect said user to a first server for providing said voice service, wherein said first instruction includes an identifier of said first server and a first information related to content of said voice service;
   sending a first message including said first information to said first server so as to redirect said user to said first server, according said first instruction;
   wherein
   if a determined event is an event of providing said user with voice announcement, said first server is a media resource function device, and said first information includes a second information for instructing said media resource function device to perform voice announcement related to said event of voice announcement; and
   if said determined event is an event of providing said user with interactive voice response, said first server is an interactive voice response device, and said first information includes a third information for instructing said interactive voice response device to perform interactive voice response related to said event of interactive voice response.

6. A method according to claim 5, further comprising, after the sending:
   receiving, from said first server, a second message for indicating end of said voice service;
   sending, to said online charging system, a second request for indicating end of said voice service in response to said second message.

7. A method according to claim 6,
   further comprising, before the receiving from the online charging system:
   sending, to said online charging system, a first request related to online charging for a session between said user and a counterpart user;
   and further comprising, after the sending to said online charging system:
   receiving, from said online charging system, a second instruction for instructing said online charging client to redirect said user to said counterpart user, and redirecting said user to said counterpart user according said second instruction.

8. A method of providing a user with charging-related voice service in a media resource function device of an IP multimedia subsystem, comprising:

receiving, from an online charging client or an interactive voice response device, a second information for instructing said media resource function device to perform voice announcement related to said voice service;

generating corresponding announcement information according to said second information, and play said announcement information to said user; and receiving, from the interactive voice response device, an additional second information for instructing the media resource function device to perform voice announcement and collect user input.

9. A method according to claim 8, further comprising: after said playing ends, sending, to said online charging client, a second message for indicating end of said voice service.

10. A method according to claim 8, wherein said second information is further for instructing said media resource function device to perform an operation which is related to said voice service and for collecting an input from said user, and said method further comprises:

receiving said input from said user;
generating a third message for identifying said input according to said input;
sending said third message to said interactive voice response device.

11. A method according to claim 10, further comprising:

receiving, from said interactive voice response server, a fourth message for indicating end of said voice service,
ending said voice service in response to said fourth message.

12. A method of providing a user with charging-related voice service in an interactive voice response device of an IP multimedia subsystem, comprising:

receiving, from an online charging client, a third information for instructing said interactive voice response device to perform interactive voice response related to said voice service;

performing a corresponding interactive operation according to said third information;

wherein said interactive operation includes:

generating a second information for instructing a media resource function device to perform voice announcement related to said voice service and an operation for collecting an input from said user, and sending said second information to said media resource function device; and receiving, from said media resource function device, a third message for identifying said input of said user, and performing a predetermined operation according to said third message.

13. A method according to claim 12, wherein;

if said third message is for instructing an operation to account profile of said user:
generating a corresponding operation request according to said third message, and
sending said operation request to said online charge system;

if said third message is for requesting exit:
sending, to said media resource function device, a fourth message for indicating end of said voice service; and
sending, to said online charging client, a second message for indicating end of said voice service.

* * * * *